United States Patent [19]
Prince et al.

[11] Patent Number: 6,027,642
[45] Date of Patent: Feb. 22, 2000

[54] MOBILE PORTABLE WATER DISINFECTION/FILTRATION AND HAZARDOUS CHEMICAL OXIDIZING SYSTEM

[76] Inventors: Richard N. Prince, 6170 Rolling Ct., Georgetown, Calif. 95634; Alan M. Young, 8981 Colombard St., Sacramento, Calif. 95829; Donald M. Young, 3441 Data Dr., No. 336, Rancho Cordova, Calif. 95670

[21] Appl. No.: 09/042,392

[22] Filed: Mar. 12, 1998

[51] Int. Cl.[7] .................................................... C02F 1/78
[52] U.S. Cl. .......................... 210/180; 210/181; 210/202; 210/205; 210/206; 210/253; 210/790; 210/760; 261/113; 261/123
[58] Field of Search .................................... 210/760, 790, 210/149, 181, 180, 192, 195.1, 202, 203, 150, 151, 206, 205, 253; 261/113, 123

[56] References Cited

U.S. PATENT DOCUMENTS

| | | | |
|---|---|---|---|
| 2,454,124 | 11/1948 | Birsch et al. | 210/253 |
| 3,436,343 | 4/1969 | Smith | 210/32 |
| 3,488,037 | 1/1970 | Prochazka et al. | 261/113 |
| 4,250,040 | 2/1981 | La Raus | 210/760 |
| 4,256,574 | 3/1981 | Bhargava | 210/614 |
| 5,368,726 | 11/1994 | Masoomian | 210/203 |
| 5,427,693 | 6/1995 | Mausgrover et al. | 210/739 |
| 5,626,745 | 5/1997 | Hawkinson | 210/203 |
| 5,637,231 | 6/1997 | Hill et al. | 210/748 |
| 5,785,864 | 7/1998 | Teran et al. | 210/739 |

*Primary Examiner*—Peter A. Hruskoci
*Attorney, Agent, or Firm*—Frank D. Gilliam

[57] ABSTRACT

A water purification system which filters particulates from the water and treats organic contaminats with ozone. The incoming contaminated water flow is divided, with half passing through each of two filter and ozone contact systems. Initially, each stream is passed though a sand separation device to remove large high density particulate mater, then through a multi-stage filter arrangement incorporating disposable filter cartridges. Ozone is injected into each stream leaving the filter system. The flow passes through elongated plug-flow tubing to assure optimum water/ozone contact, then enters a multi-compartment secondary contactor having a series of perforated baffle plates through which the water flows to assure complete ozone/water contact. Finally, each stream passes through a final filter stage, then the streams are combined and pass to storage or a purified water outlet. If desired, the entire flow can be passed through the combined ozone injection system, a selected filtration system and the water/ozone gas contact system.

20 Claims, 5 Drawing Sheets

MOBILE PORTABLE WATER DISINFECTION/FILTRATION AND HAZARDOUS CHEMICAL OXIDIZING SYSTEM

FIELD OF THE INVENTION

This invention relates to apparatus for filtering and disinfecting water from a variety of sources to produce potable water and for oxidizing and removing hazardous chemicals in the water.

BACKGROUND OF THE INVENTION

Raw water from fresh water sources such as wells, ponds, streams, lakes, etc. varies widely in quality and must generally be treated to make it potable. Often, it is necessary to treat water in remote areas for limited periods, such as during a military deployment, a remote short term construction project, after damage to a local permanent purification system, etc.

In addition, due to tanker truck spills, hazardous material leaks, etc. there are often needs for neutralizing and/or removing hazardous chemicals from the environment. In addition, where surface water is contaminated, decontamination and return to the surface is required without extensive treatment to the point where the water is potable.

A number of different water purification systems have been developed for treating water from a lake or river where the water is not highly contaminated. Generally, water is simply clarified, filtered to remove particulates and treated with chlorine.

Where both decontamination and disinfection of poor quality water is required, treatment with ozone is most effective. Ozone has been used for more than one hundred years to treat potable water supplies. Ozone is extensively used in municipal water plants in Europe, largely because of the poor quality of the water supplies. Ozone also provides superior disinfection and excels in the control of taste and color.

The extremely high effectiveness of ozone is due to its great oxidizing power. Ozone acts to oxidize pollutants and as a germicidal agent for microorganisms. Resistant sporulating types of bacteria are destroyed by ozone along with pathogenic and saprophytic organisms likely to be encountered in water. Ozone is used in the treatment of drinking water for bacterial disinfection, destruction of viruses and protozoans, increasing settleability characteristics, removal of algae, sulfides, cyanides, trihalomethane precursors organics, detergents, pesticides, phenols and humnic, fulvic and tannic acids. Soluble iron, manganese and other heavy metals are oxidized to insoluble forms that can be filtered from the water. Large, complex organic compounds are oxidized into smaller more easily biodegradable molecules. With the removal of organic compounds comes removal of odor, color and taste in the water. Ozone has been recognized to be significantly more effective than chlorine as a germicide against bacteria, viruses and protozoans.

Various devices and methods have been developed for purifying drinking water and waste water, such as those described by Laraus in U.S. Pat. No. 4,250,040 and Bhargava in 4,256,574. Prior ozone treatment plants have tended to be large, fixed plants for treating water at a particular location over a long period.

Mausegrover et al. describe a truck mounted ozone water treatment apparatus in U.S. Pat. No. 5,427,693. This apparatus includes a process tank for holding contaminated water and an ozone generator using a venturi to inject ozone into a water stream directed from the process tank to an infusion chamber. While probably effective for small quantities of lightly contaminated water, no provision is made for effectively filtering the water or of altering the throughput sequence for varying contamination. Also, the apparatus does not appear to be capable of routine transport by fixed wing aircraft or helicopters, limiting its effectiveness due to lack of mobility.

Thus, there is a continuing need for a portable ozone type water treatment system having improved decontamination capability, effective filtration for water of varying quality and that can adjust throughput rates and intensity Of treatment to accommodate widely different water quality characteristics.

SUMMARY OF THE INVENTION

The above-noted problems, and others, are overcome in accordance with this invention by an ozone treatment system for potable water treatment and ground water or surface water remediation and which is self contained and readily portable.

In use, raw water is pressurized, typically by an external pump, and directed through a manifold to at least two independent parallel trains. The use of two or more independent trains allows one train to be shut down for maintenance, etc., while continuing operation of the remainder of the system. In each train, the water enters a passive centrifugal sand separator where large diameter matter is captured. Where a pressurizing pump is used, preferably large matter is captured in a pump strainer. Purging means is included for periodically purging the sand separator to waste.

The flow then enters a multistage, typically three stage, filter system. The filter stages include disposable filter cartridges of differing graded porosity. If desired, the filter cartridges may contain granulated activated carbon, ceramic polypropylene or resin bonded cellulose, depending on the treatment desired.

After leaving the filter system, the flow is injected with ozone gas through a venturi and enters a plug-flow contact system constructed of flexible tubing, the size and diameter of which is configured for maximum ozone gas contact over a selected range of flow.

A unique multi-stage secondary contact vessel receives the flow from the tubing. The secondary contact vessel includes a novel combination of perforated baffle-plates that serve as compartment separators. The baffle plate orifices are located to provide optimum ozone gas contact.

A fourth filter stage receives flow from the secondary contact vessel. The fourth filter stage contains cartridges having porosity and type selected in accordance with the desired levels of water quality in terms of final stage or precipitation turbidity removal. The fourth filter stage also acts as an ozone contact vessel, providing additional detention and ozone contact.

Both flow trains are combined after leaving the fourth filter stages of the separate trains and the combined flow passes to a manifold for delivery to storage or other uses. This water treatment system may be configured in either a rapid deployment mobile configuration or in a stationary configuration that is easily converted between potable water treatment and ground water or surface water remediation.

In the potable water treatment configuration, this system may be used to treat raw water from fresh water sources (wells, ponds, streams, lakes, etc.) of varying quality. The system may also be used in conjunction with an existing municipal or community water treatment system that has been contaminated and/or is not functioning properly. The system is capable of eliminating bacterial contamination, including removal or reduction of sporulating types of bacteria along with pathogenic and saprophytic organisms, including Cryptosporidium and related Giardia species as well as pathogenic viral materials. In addition, the system will remove or reduce color, taste, odor algae, sulfides, cyanides, trihalomethane precursors, detergents, pesticides, phenols, fulvic and tannic acids. Also, it will oxidize miscellaneous organic compounds, and soluble iron, manganese and other heavy metals. Large complex organic compounds will be oxidized into smaller more easily biodegradable molecules.

In the groundwater or surface water remediation configuration the system will, through oxidation, break down and destroy inorganic and organic chemicals such as chloroform, carbon tetrachloride, cis-1,2-dichloroethane, 1,1,2-trichloroethane, methylene chloride and many others in addition to those constituents listed in the preceding paragraph.

In the rapid deployment mobile configuration the system is enclosed in a skid-mounted, sturdy but light weight container for easy transporting by ground vehicles, helicopters, cargo aircraft and waterborne vessels such as barges. This configuration is particular useful by military organizations during rapid deployments, and by emergency management agencies in natural disasters such as earthquakes or floods where normal water supplies are disrupted, etc.

Where the purpose of treating a given supply of water is for groundwater and/or surface water remediation, rather than to produce potable water, filter cartridges may be omitted from the initial filter stages. The ozone injector line may be relocated to inject ozone into the flow line in advance of the filter housings to provide additional ozone contact time prior to flow entering the plug-flow and subsequent secondary contact vessel.

If desired, fittings may be provided to enable the parallel multi-train configuration to be converted into an in-line series where large increases in the level of ozone applied and ozone contact time are desired.

While the system could be operated manually, for most efficient operation a solid state programmable logic controller of the sort available from IDEC programmed in a conventional manner to take flow, turbidity, ozone residual, etc. readings from appropriate points, as discussed below, and control operation is preferred. Typical monitors that would be used in the control and operation of the system include a leak detection monitor, a turbidity analyzer, a dissolved ozone monitor, etc.

BRIEF DESCRIPTION OF THE DRAWINGS

Details of the invention, and of preferred embodiments thereof, will be further understood upon reference to the drawing, wherein.

DETAILED DESCRIPTION OF PREFERRED EMBODIMENTS

Figure 1A:
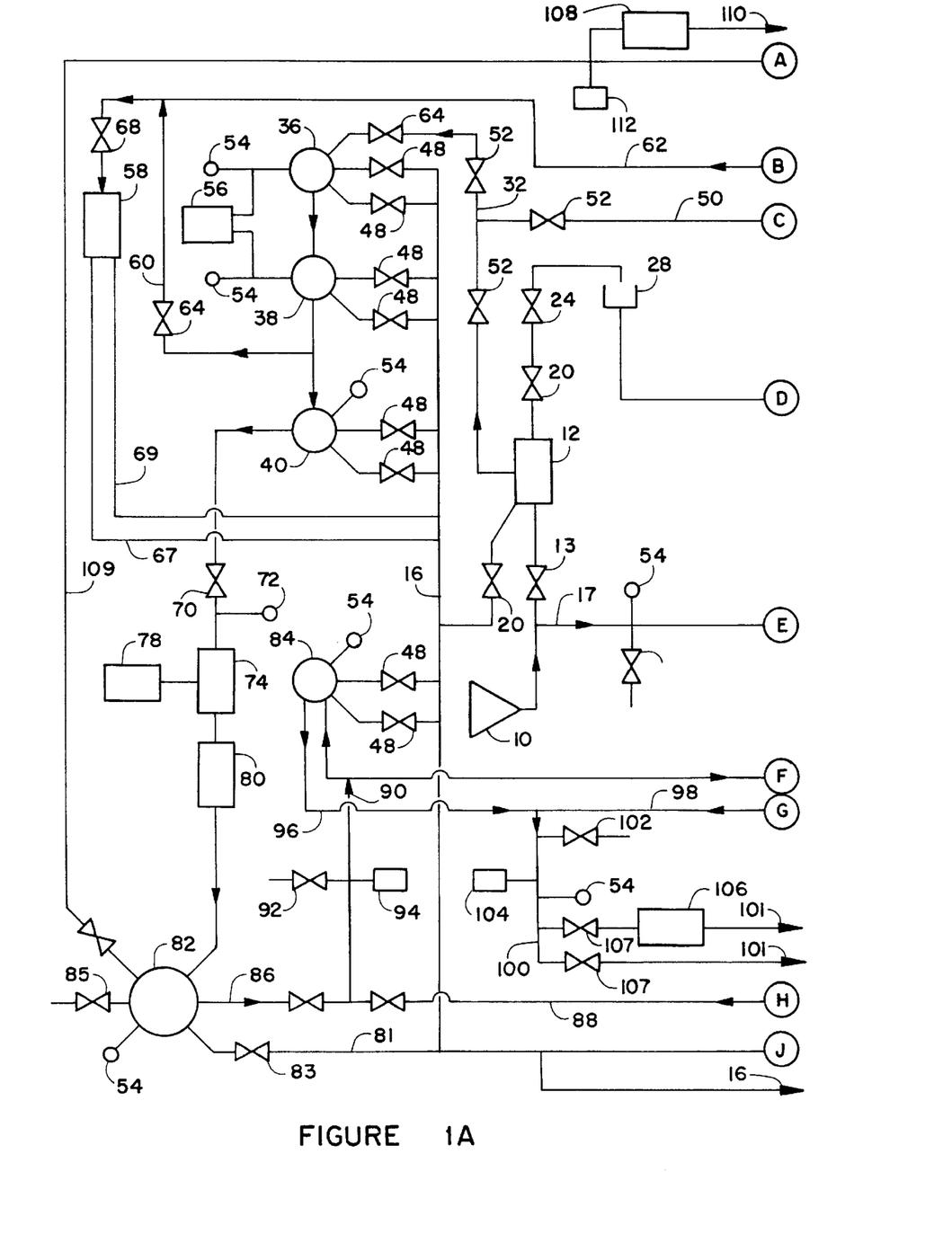
FIGS. 1A and 1B when combined provide a schematic hydraulic diagram of a multiple parallel train potable water treatment system of this invention.
Figure 1B:
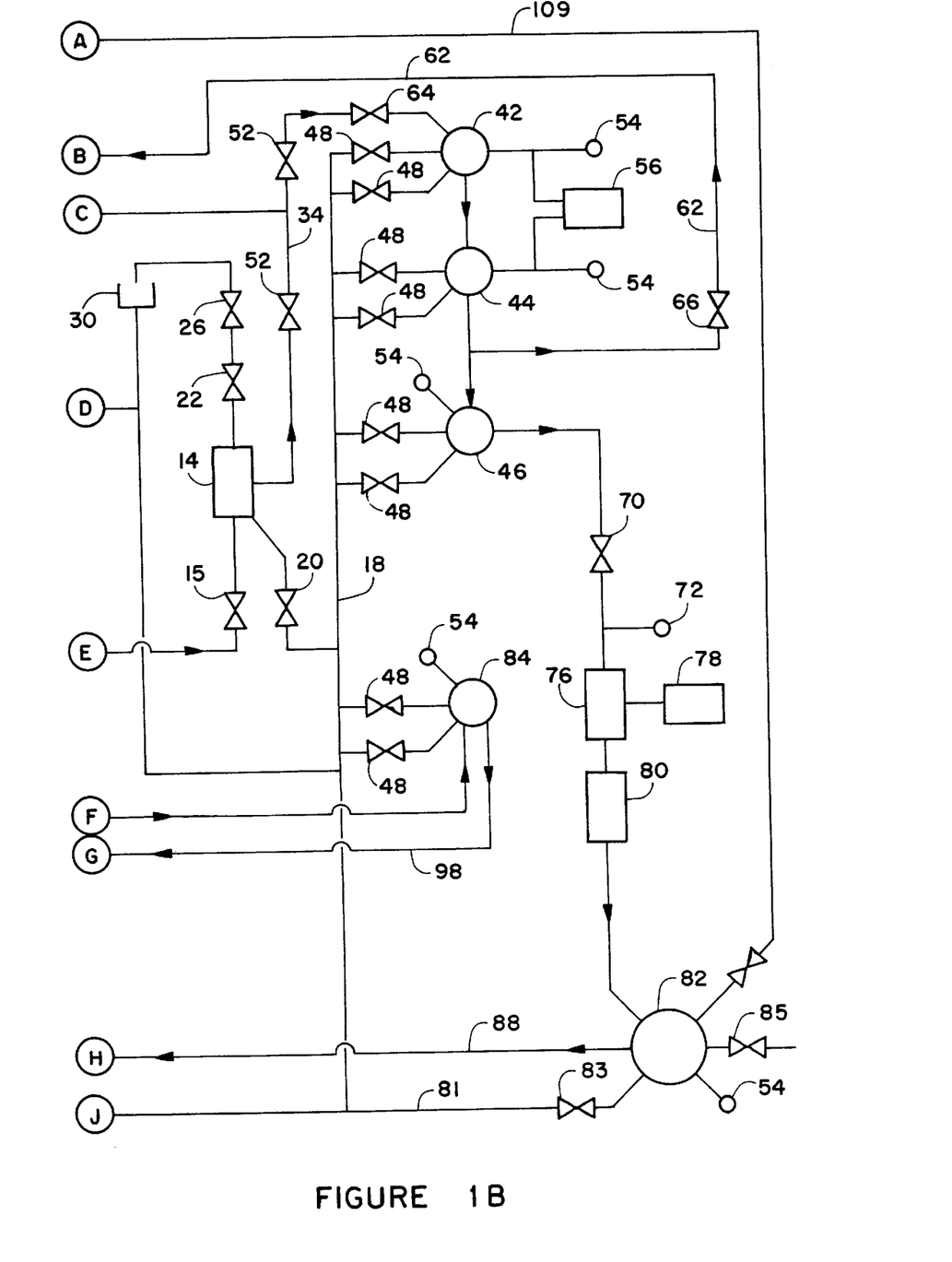

Referring to FIG. 1, there is seen a schematic hydraulic diagram showing the multi-train embodiment of the water treatment system. Pressurized water to be treated enters through inlet 10. Typically, the water may come from a pressurized city system or may be pumped. Where the water is pressurized by an external pump (often of the submersible type) and the water and may contain large particles, a conventional strainer is preferably used with the pump. A typical pump could be Model 18G530 stainless steel submersible pump from the Gould Company. The pump should be suitable for submersion in a shallow, rapid current water source and have a large external object inlet screen.

The water flow is divided at point 12 into two separate first and second trains. With a two train, parallel, arrangement, each train may be operated independently so that the operator may perform maintenance such as periodic injector cleaning, filter cartridge examination and/or replacement on one train without ceasing production. If desired, three or more parallel trains could be used, although generally two trains provide an optimum combination of light weight, low system complexity and system efficiency.

Water passes to first and second centrifugal sand separators 12 and 14 in the first and second trains, respectively, through ball valves 13 and 15, respectively. Suitable sand separators are available from Yardney Water Management Systems, Inc. under the Model R7V designation. Periodically first and second sand separators 12 and 14 are manually purged of particulate matter through the common waste drain line via a ball valve 20 and aerosols through ball valve 22 and air relief valve 24 and collector 26. The purged water and sand reaches common drain lines 16 and 18 through ball valves 20 and 22 and aerosols are expelled via air release valves 24 and 26. Collectors 28 and 30 redirect moisture to common drain lines 16 and 18.

Water flow cleaned of sand from sand separators 12 and 14 passes through lines 32 and 34, respectively, to a first train consisting of filter stages 36, 38 and 40 and a second train consisting of filter stages 42, 44 and 46. A by-pass arrangement including bypass line 50 and ball valves 52 is provided so that flow from either (or both) sand separators 12 and 14 can be directed to either filter train.

Each filter stage 36–46 is typically a stainless steel vessel incorporating disposable filter cartridges (such as depth-type, pleated, wound, etc.) of differing graded porosity. These cartridges may be supplemented, when desired, with granulated activated carbon or ceramic cartridges. Typically such filter housings and cartridges may be obtained from Cuno, Inc. Ball valves 48 are provided to allow purging or back flushing of each filter stage 36–46. Pressure gages 54 are provided at each filter stage 36–46 to show pressure in the stage and pressure drop across the filter media in each stage. A differential pressure switch 56 is provided across each pair of filter stages 36 and 38 and stages 42 and 44. If the pressure differential exceeds a pre-programmed pressure target, usually indicating a need for filter cartridge replacement, switch 56 will trigger an alarm in the control system which can shutdown the system.

For the system to operate efficiently, system temperature must be maintained below a predetermined level. Both oxygen preparation and ozone generation lose efficiency once the ambient temperature exceeds 90° F. An air conditioner unit 58, typically a K2AC12WNP47 from Kooltronics is preferably included. Water is directed to air conditioner 58 from the outlet line of filter stages 38 and/or 46 via lines incorporating check valves 64 and 66 and pressure relief valve 68. An air conditioner drain line 67 and condensate drain line 69 drain waste water from air conditioner 58 to common waste line 16.

If freezing temperatures are likely, a conventional heater (not shown) is included in the housing for the system. Also, if high humidity conditions are likely, preferably regenerating desiccant material may be included in the control and processing compartments.

The water flow departing the second filter stages 40 and 46 passes through flow control valves 70 and flow meters 72, then enters venturi-type ozone injectors 74 and 76, respectively. Typical such injectors include those available from the Mazzie Injector Corporation. Any suitable source of industrial grade oxygen and any suitable ozone generator 78 may be used. Typical oxygen generators take in ambient air, compress it, then feed the compressed gas into a series of pressure swing absorption molecular sieve containers that both dry the gas and remove nitrogen and argon. Such a generator delivers approximately 95% pure oxygen to the ozone generator. Preferably, ozone is generated by an air-cooled, solid-state, high frequency, corona discharge generator. Typical of such preferred ozone generators is the ozone generator of the sort available from Pacific Technology, Inc. Under the G22 or SG22 designations.

Flow from ozone generators 78 passes to a plug-flow contact system 80 constructed of flexible tubing. Tygon inter-braid tubing is preferred. While any suitable length and diameter may be used, for best results lengths of from about 130 to 150 feet and diameters of from about 1 to 2 inches are preferred.

Figure 3:
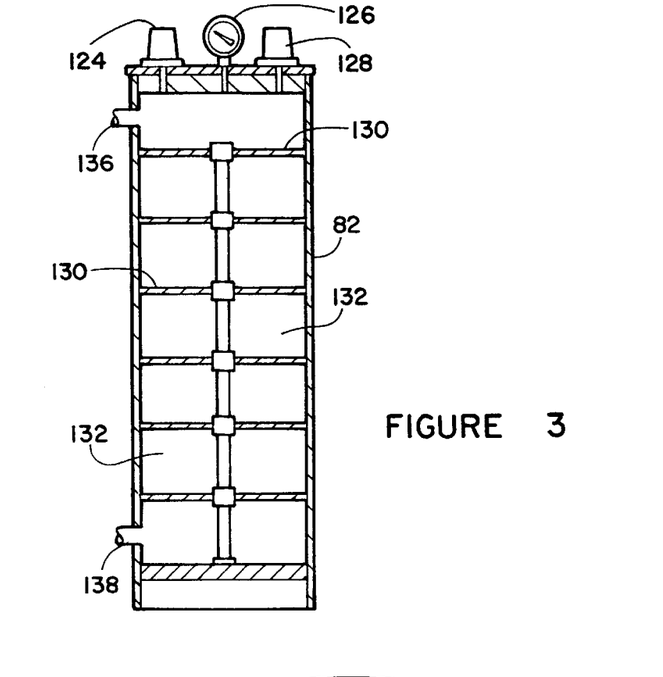
FIG. 3 is an elevation view, partly cut-away, of an ozone secondary contact vessel.
Figure 4:
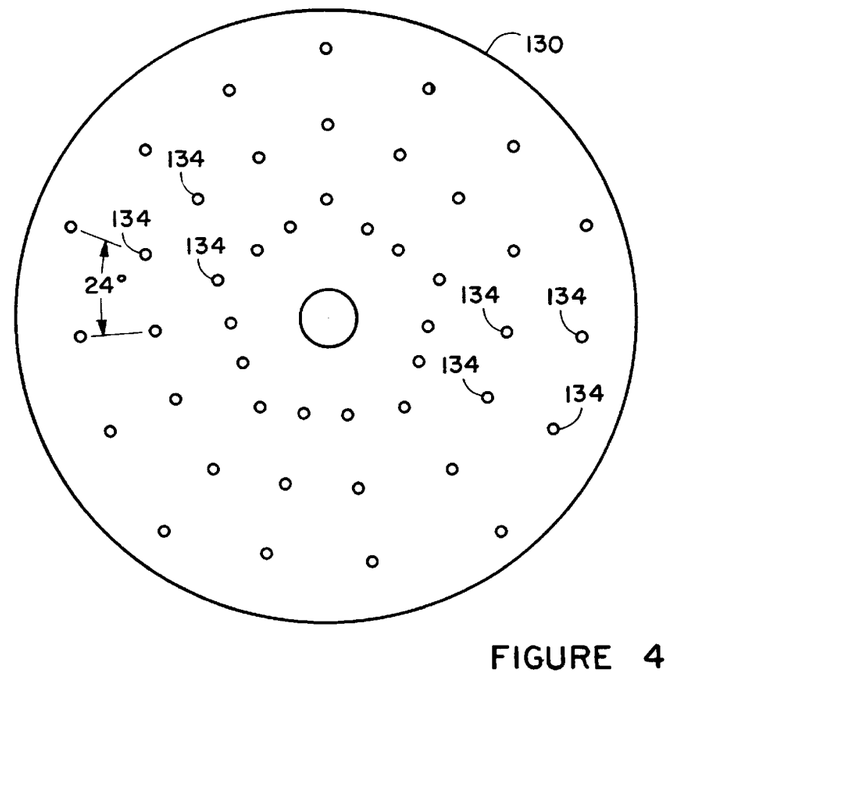
FIG. 4 is a section view taken on line 4—4 in FIG. 3, showing a baffle plate.

The water flow from each contact system 80 then enters a multi stage secondary contact vessel 82. Each vessel 82 has a series of perforated baffle plates forming a series of compartments though which the water flows from one end of the vessel to the other to provide optimum ozone gas/water contact. Details of vessels 82 is provided below in conjunction with the description of the vessels as illustrated in FIGS. 3 and 4. A line 81, controlled by ball valve 83, can be used to drain each vessel 82 to common waste lines 16 and 18 when desired. Each vessel 82 is also connected to a pressure release valve 85 and a pressure gauge 54.

From contact vessels 82 flow is directed to fourth filter stages 84 through lines 86 and 88. Flow from both contact vessels combines at line 90, then divides and flows to fourth filter stages 84. A sample port 92 and ozone sensor probe 94 in line 90 are used to monitor the quality of the water at this point. Filter stages 84 contain cartridges of a selected porosity and type, selected in accordance with the desired level of water quality. In this process, fourth filter stages 84 also act as water/ozone contact vessels, offering additional detention and ozone contact. Valves 48 are provided to purge filters 84 as needed. After leaving fourth filter stages 84 the flows are recombined through lines 96 and 98 at manifold 100 for delivery to purified water storage, waste or other uses through lines 101. The delivery destination is PLC controlled, based on pre-selected quality control parameters.

Manifold 100 preferably includes a sample port 102, a turbidity sensor 104, a pressure gauge 54 and solenoid valves 107 in output lines 101.

In some cases, it may be desirable to insert an ultra-violet light sub-system 106 following the secondary contact vessels 82, preferably in storage outlet line 101. The additions of short, high intensity bursts of ultraviolet light cause the production instantaneous and short duration free hydroxyl radicals that add an oxidation boost to the remediation process which can be highly desirable where the water contains a high level of contaminants.

An off-gas ozone destruction unit 108 is provided to collect, through lines 109, off-gas from the tops of secondary contact vessels 82. A thermally operated destruct unit of the sort available from Pacific Technology, Inc. under the D412 designation is included in unit 108, with the resulting environmentally acceptable gas vented through line 110 to the atmosphere. A water trap 112 is provided to collect any water accumulation from lines 109 prior to off-gas destruct unit 108.

Figure 2A:
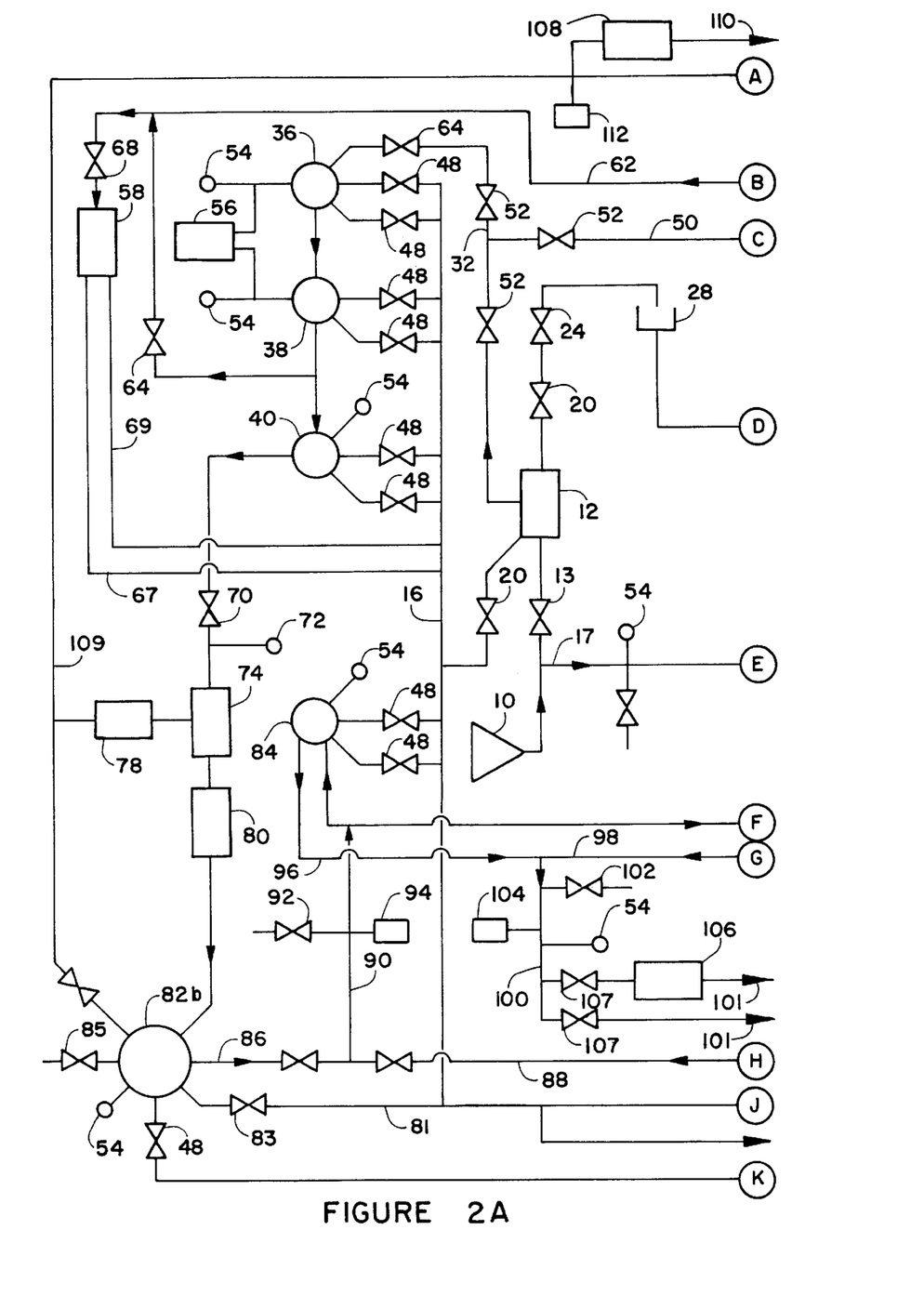
FIGS. 2A and 2B when combined provide a schematic hydraulic diagram of the water treatment system of FIGS. 1A and 1B optimized for ground water and/or surface water remediation.
Figure 2B:
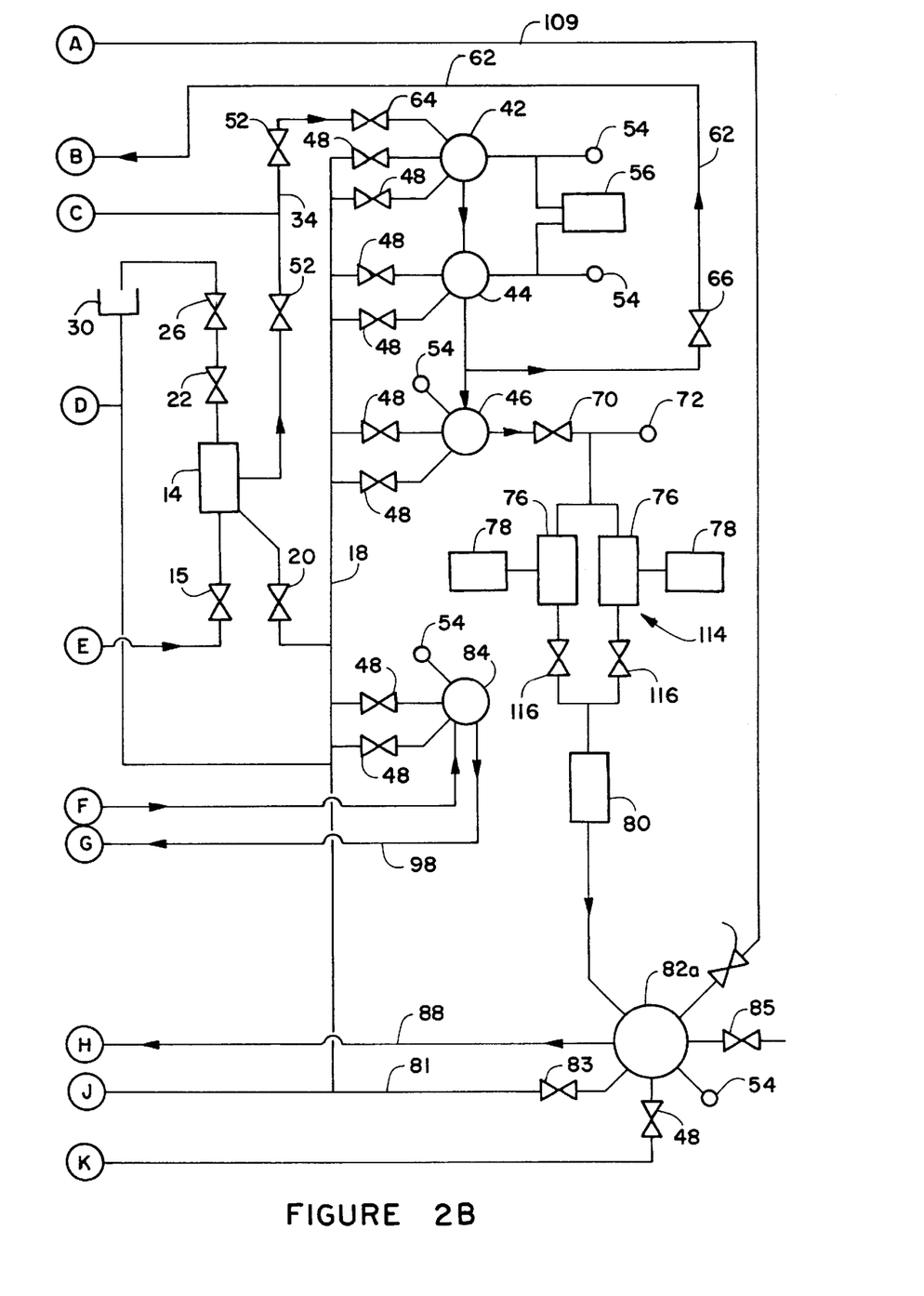

FIG. 2 is a schematic hydraulic circuit diagram of a variation of the system shown in FIG. 1 that is optimized for surface or ground water remediation where the primary purpose is to remove volatile organic contaminants. The water produced will be returned to the surface or underground and need not be potable.

Since this is a variation on the FIG. 1 system, most components are common to both and are identified with the same reference numbers. For clarity, the water flow path in the FIG. 2 variation is shown in heavy lines.

Ball valve 13 is closed to isolate one train of the dual train, parallel system of FIG. 1 from water inlet 10. Contaminated water flows from inlet 10 to second sand separator 14, then to filter stages 42, 44 and 46 in seriatim. The flow then passes to ozone injection system 114. For maximum ozone injection, dual parallel ozone injectors 76, each fed by an ozone generator 78 are required. Water then flows through an elongated tubular plug flow contactor 80 and to secondary contactor 82*a*.

Bypass line 114 connects an outlet from secondary contact vessel 82*a* to an inlet into secondary contact vessel 82*b*. Greater ozone volume and longer contact is highly desirable wherein decomposition of large molecule organic contaminants is necessary. Treated water from secondary contact vessel 82*b* then flows through lines 86 and 90 and is divided between inlets to two fourth filter stages 84. The water then passes to outlet line 101. If desired, a UV station 106 can be included in the outlet line 101.

The arrangement of FIG. 2 is preferred for surface and ground water remediation where the water is heavily contaminated with volatile organic contaminants and the water is to be returned to the environment. Massive ozone injection in conjunction with UV radiation will result in the destruction or reduction to acceptable levels of the susceptible volatile organic contaminants.

A novel secondary ozone/water secondary contactor vessel 82 is illustrated in FIGS. 3 and 4.

Basically, secondary contact vessel 82 is cylindrical, formed from any suitable material, such as stainless steel, glass fiber reinforced polyester resins, poly vinyl chloride, etc. While secondary contact vessel 82 may have any suitable dimensions, typically, the height will be from about 60 to 80 inches and the inside diameter from about 12 to 20 inches with an inside diameter of about 16 inches and inside height of about 63 inches being optimum. Top and bottom end closures 120 and 122, respectively, are typically formed from reinforced polyester or polyvinyl chloride resins. Preferably, an air relief valve 124, a pressure gauge 126 and a pressure relief valve 128 are provided through top closure 120.

A plurality of spaced baffle plates 130 are installed across the interior of secondary contact vessel 82, forming compartments 132 therebetween. While any suitable number and spacing of baffle plates 130 may be used, generally from 4 to 8 uniformly spaced plates is preferred. For best results, six equally spaced baffle plates 130 are used. The baffle plates may be formed from any suitable material reinforced polyester or polyvinyl chloride resins. Preferably baffle plates 130 are formed from 0.5 inch thick schedule 80 polyvinyl chloride.

Each baffle plate 130 has a pattern of holes 134 therethrough. While any suitable size, number and pattern of perforations 134 may be used, for optimum contact between injected ozone and flowing water, the holes should have diameters of from about 0.2 to 0.35 inch and should have the pattern shown. The optimum pattern of holes 134 has 45 holes through each baffle plate 130 arranged in fifteen radial rows of three substantially equally spaced holes. The hole pattern can also be thought of as preceding three substantially equally spaced, generally circular, rows of fifteen holes 134. Around each row, each third hole 134 is spaced outwardly relative to the other holes.

Where the diameter of a baffle plate is equal to the inside diameter of the contactor, e.g., 16 inches, the inner hole circle will have a diameter of about 2.5 inches, with every third hole 134 spaced about 3 inches from the secondary contact vessel center point 135. The second generally circular row away from center point 135 has a diameter of about 4.5 inches, with every third hole 134 spaced about 5 inches from the secondary contact vessel center point 135. The third generally circular row away from 135 has a diameter of about 6.5 inches, with every third hole 134 spaced about 7 inches from the secondary contact vessel center point 135. This pattern provides superior ozone/water contact, as random alignment of the baffle plates precludes the potential for short-circuiting of the ozonated water column, insuring maximum interface of the gas and liquid and maximum contact time for the oxidation processes to occur. For best results, the holes 134 in each baffle plate 130 are not aligned with the holes in the adjacent baffle plates. Preferably, the rotational offset from plate to plate is about 30° to 40°. A rotational offset of about 36° has been found to be optimum in most cases.

A water inlet 138 is provided for directing water from line 80 into the lowermost chamber 132. A water outlet 136 is provided for directing water out of the uppermost chamber 132 to filter stage 84, as shown in FIGS. 1 and 2.

While certain specific relationships, materials and other parameters have been detailed in the above description of preferred embodiments, those can be varied, where suitable, with similar results. Other applications, variation and ramifications of the present invention will occur to those skilled in the art upon reading the present disclosure. Those are intended to be included within the scope of this invention as defined in the appended claims.

We claim:

1. A water purification system which comprises:
   an inlet manifold for receiving pressurized water;
   at least two independent sand separation means for receiving water from said inlet manifold
   at least two multi-stage filter trains, each for receiving of water from one of said sand separation means;
   each of said filter trains having a plurality of removable filter cartridges for filtering out predetermined contaminants in said water;
   a source of ozone;
   venturi means for receiving water from each of said filter trains and for injecting ozone from said source into said water;
   an elongated contact tube for receiving water from said venturi means and causing plug flow contact between said ozone and contaminants in said water;
   a multi-compartment secondary contactor for receiving water from said contact tube for assuring optimum ozone gas contact with remaining contaminants in said water;
   additional filter stages for receiving and filtering water from said secondary contactor; and
   means for combining water flow from all said additional filter stages and directing said combined water flow to a purified water outlet.

2. The water purification system according to claim 1 further including:
   means at said inlet manifold for directing the water flow to a single path through said multi-stage filter trains, said venturi means, said contact tube, and said secondary contactor;
   means for directing flow from said secondary contactor through a second secondary contactor;
   means for directing flow from said second secondary contactor through at least two said parallel filter stages; and
   means for directing flow from said additional filter stages to said purified water outlet.

3. The water purification system according to claim 1 wherein each of said filter cartridges is selected from the group consisting of pleated, granulated activated carbon and ceramic filter cartridges and combinations thereof.

4. The water purification system according to claim 1 wherein said elongated contact tube has a length of from about 130 to 150 feet and inside diameter of from about 1 to 2 inches.

5. The water purification system according to claim 1 wherein said multi-compartment secondary contactor has an inside diameter of from about 12 to 20 inches, a height of from about 60 to 80 inches and includes 5 to 8 approximately equally spaced transverse perforated baffle plates forming a plurality of compartments with a water flow inlet into one endmost compartment and a water flow outlet from an opposite endmost compartment.

6. The water purification system according to claim 5 wherein said multi-compartment secondary contactor has an inside diameter of about 16 inches, an inside height of about 63 inches, each of said baffle plates has 45 approximately 0.25 inch diameter holes arranged in 15 substantially uniformly spaced radial rows of 3 holes, the holes in each row spaced apart approximately 2 inches, the innermost holes in each row spaced approximately 2.5 inches from a baffle plate center and with every third innermost hole spaced approximately 3 inches from said center.

7. The water purification system according to claim 1 further including an air conditioning means for maintaining system components at a selected temperature and including means for diverting a portion of water flow from said multi-stage filter train to said air conditioning means.

8. The water purification system according to claim 1 further including means for directing purge water from each of said filter stages and from said multi-compartment secondary contactor to a waste water outlet.

9. The water purification system according to claim 1 further including means for venting any off-gas from said multi-compartment secondary contactor to the atmosphere and means for destroying any ozone in said off-gas.

10. A water purification system which comprises:
    an inlet manifold for receiving pressurized water;

a sand separation means for receiving water from said inlet manifold a multi-stage filter train for receiving of water from said sand separation means;

said filter train having a plurality of removable filter cartridges for filtering out predetermined contaminants in said water;

a source of ozone;

venturi means for receiving water from said filter train and for injecting ozone from said source into said water;

an elongated contact tube for receiving water from said venturi means and causing contact between said ozone and contaminates in said water;

a first multi-compartment secondary contactor for receiving water from said contact tube for causing further ozone gas contact with said water;

a second multi-compartment secondary contactor for receiving water from said first multi-compartment secondary contactor for causing further ozone gas contact with remaining contaminants in said water;

means for dividing water flow from said second multi-compartment secondary contactor into two approximately equal flows;

two additional filter stages, each for receiving and filtering one of said two approximately equal flows; and means for combining water flow from said additional filter stages and directing said combined water flow to a purified water outlet.

11. The water purification system according to claim 10 wherein said multi-compartment secondary contactor has an inside diameter of from about 12 to 20 inches, a height of from about 60 to 80 inches and includes 5 to 8 approximately equally spaced transverse perforated baffle plates forming a plurality of compartments with a water flow inlet into one endmost compartment and a water flow outlet from an opposite endmost compartment.

12. The water purification system according to claim 11 wherein said multi-compartment secondary contactor has an inside diameter of about 16 inches, an inside height of about 63 inches, each of said baffle plates has 45 approximately 0.25 inch diameter holes arranged in 15 substantially uniformly spaced radial rows of 3 holes, the holes in each row spaced apart approximately 2 inches, the innermost holes in each row spaced approximately 2.5 inches from a baffle plate center and with every third innermost hole spaced approximately 3 inches from said center.

13. The water purification system according to claim 10 further including an air conditioning means for maintaining system components at a selected temperature and including means for diverting a portion of water flow from said multi-stage filter train to said air conditioning means.

14. The water purification system according to claim 10 further including means for directing purge water from each of said filter stages and from said multi-compartment secondary contactor to a waste water outlet.

15. The water purification system according to claim 10 further including means for venting any off-gas from said multi-compartment secondary contactor to the atmosphere and means for destroying any ozone in said off-gas.

16. A vessel for bringing ozone and water into intimate contact which comprises:

an elongated tubular vessel having a centerline, said elongated tubular vessel has a inside length of from about 60 to 80 inches and an inside diameter of from about 12 to 20 inches;

first and second closure means for closing first and second ends of said vessel, respectively;

from about 4 to 8 spaced baffle plates across said vessel substantially transverse to said centerline;

from about 12 to 18 radially extending rows of from 2 to 4 holes perpendicular to said centerline through each baffle plate;

said baffle plates having a rotational offset from baffle plate to baffle plate in the range of 30 to 40 degrees;

corresponding holes perpendicular to said centerline in each said row lying generally along a circle about said centerline, with holes in every third to fifth row offset outwardly of the corresponding circle a predetermined distance;

means for introducing a mixture of ozone and water into said vessel between said first closure means and an adjacent baffle; and means for discharging said mixture of ozone and water from said vessel between said second closure means and an adjacent baffle.

17. The vessel according to claim 16 wherein holes in each row are spaced apart substantially equal distances and where the innermost hole in each said offset row is spaced from said centerline a distance about 110 to 130 percent of the distance the innermost hole in each row other an offset row is spaced from said centerline.

18. The vessel according to claim 16 wherein each row has three holes, there are 15 rows and every third row is a said offset row.

19. The vessel according to claim 16 wherein, said holes are generally round with diameters of from about 0.2 to 0.4 inch and said baffles are substantially equally spaced along said inside length of said vessel.

20. The water purification system according to claim 16 wherein vessel has an inside diameter of about 16 inches, an inside height of about 63 inches, 6 baffle plates are provided, spaced substantially equally from each other and from said end closures, each of said baffle plates has 45 approximately 0.25 inch diameter holes arranged in 15 substantially uniformly spaced radial rows of 3 holes, the holes in each row spaced apart approximately 2 inches, the innermost holes in each row spaced approximately 2.5 inches from a baffle plate center and with every third innermost hole spaced approximately 3 inches from said center.

* * * * *